(12) United States Patent
Rahul et al.

(10) Patent No.: US 9,031,180 B2
(45) Date of Patent: May 12, 2015

(54) COHERENT TRANSMISSION FROM DISTRIBUTED WIRELESS TRANSMITTERS

(71) Applicants: Hariharan Shankar Rahul, Cambridge, MA (US); Swarun Suresh Kumar, Cambridge, MA (US); Dina Katabi, Cambridge, MA (US)

(72) Inventors: Hariharan Shankar Rahul, Cambridge, MA (US); Swarun Suresh Kumar, Cambridge, MA (US); Dina Katabi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/646,176

(22) Filed: Oct. 5, 2012

(65) Prior Publication Data

US 2013/0089123 A1    Apr. 11, 2013

Related U.S. Application Data

(60) Provisional application No. 61/543,832, filed on Oct. 6, 2011.

(51) Int. Cl.
*H04L 7/00* (2006.01)
*H04L 27/26* (2006.01)
*H04L 25/02* (2006.01)

(52) U.S. Cl.
CPC ........ *H04L 27/2657* (2013.01); *H04L 27/2691* (2013.01); *H04L 25/0204* (2013.01); *H04L 27/2695* (2013.01); *H04L 27/2634* (2013.01)

(58) Field of Classification Search
None
See application file for complete search history.

(56) References Cited

U.S. PATENT DOCUMENTS

| | | | |
|---|---|---|---|
| 8,150,345 B2 | 4/2012 | Roy et al. | |
| 8,290,443 B2 | 10/2012 | Stirling-Gallacher et al. | |
| 8,428,524 B2 | 4/2013 | Kim et al. | |
| 8,792,444 B2 | 7/2014 | Ishida et al. | |
| 8,797,970 B2 | 8/2014 | Xing et al. | |
| 2005/0195914 A1 | 9/2005 | Kim et al. | |
| 2008/0031309 A1* | 2/2008 | Chang et al. | 375/147 |
| 2011/0065408 A1 | 3/2011 | Kenington et al. | |

(Continued)

FOREIGN PATENT DOCUMENTS

WO    WO 2011/115703    9/2011

OTHER PUBLICATIONS

Ng et al., "Linear Precoding in Cooperative MIMO Cellular Networks with Limited Coordination Clusters," IEEE Journal on Selected Areas in Communications, 28(9): 1446-1545 (2010).

(Continued)

*Primary Examiner* — Adolf Dsouza
(74) *Attorney, Agent, or Firm* — Occhiuti & Rohlicek LLP (57) ABSTRACT

In one aspect, a distributed coherent transmission system enables transmissions from separate wireless transmitters with independent frequency or clock references to emulate a system where all the transmitters share a common frequency or clock reference. Differences in frequency and/or phase between transmitters are addressed by suitably precoding signals before modulation at one or more of the transmitters based on a synchronizing transmission from one of the transmitters (e.g., a master transmitter) received at a corresponding receiver sharing the frequency or clock reference with each of the one or more transmitters. Such a distributed coherent transmission system can allow N single-antenna transmitters with independent frequency or clock references to emulate a single N-antenna Multi Input Multi Output (MIMO) transmitter, or implement schemes such as distributed superposition coding or lattice codes that require coherence across separate transmitters.

22 Claims, 3 Drawing Sheets

(56) References Cited

U.S. PATENT DOCUMENTS

2013/0102256 A1  4/2013  Cendrillon et al.
2013/0301487 A1  11/2013  Khandani

OTHER PUBLICATIONS

Tolli et al., " Decentralized Minimum Power Multi-Cell Beamfoaming with Limited Backhaul Signaling," IEEE Transaction on Wireless Communication, 10 (2): 570-580 (2011).

Berger et al., Carrier Phase Synchronization of Multiple Distributed Nodes in a Wireless Network,: IEEE $8^{th}$ Workshop on Signal Processing Advances in Wireless Communications, 2007, pp. 1-5 XP031189422.

Yang et al., "Some Phase Synchronization Algorithms for Coherent MIMO Radar," IEEE $4^{th}$ Annual Conference on Information Sciences and Systems, 2011, pp. 1-6, XP031866416.

Tu et al., "Coherent Cooperative Transmission from Multiple Adjacent Antennas to a Distant Stationary Antenna through AWGN Channels," IEEE $5^{5th}$ Vehicular Technoligy Conference, 2002, col. 1, pp. 130-134, XP001210362.

Berger et al., "A Coherent Amplify-and-Forward Relaying Demonstrator Without Global Phase Reference," IEEE $19^{th}$ International Symposium on Personal, Indoor and Mobile Radio Communications, 2005, pp. 1-5 XP031371267.

Barriac et al., "Distributed Beamforming for Information Transfer in Sensor Networks," IPSN'04, Apr. 26-27, 2004 (entire document, 8 pages).

Brown, III et al., "A Method for Carrier Frequency and Phase Synchronization of Two Autonomous Cooperative Transmitters," 2005 IEEE $6^{th}$ Workshop on Signal Processing Advances in Wireless Communications, pp. 260-264 (2005).

Rahul et al., "A Distributed Wireless Architecture for Exploiting Sender Diversity," ACM SIGCOMM, Aug. 2010 (entire document, 12 pages).

\* cited by examiner

COHERENT TRANSMISSION FROM DISTRIBUTED WIRELESS TRANSMITTERS

CROSS-REFERENCE TO RELATED APPLICATIONS

This application claims the benefit of U.S. Provisional Application 61/543,832, filed on Oct. 6, 2011, the contents of which are incorporated herein by reference.

STATEMENT AS TO FEDERALLY SPONSORED RESEARCH

This invention was made with government support under contract number CCF-0728645 awarded by the National Science Foundation. The government has certain rights in the invention.

BACKGROUND

This invention relates to coherent transmission from distributed wireless transmitters. In particular, in some examples, these transmitters are access points (APs), for instance in 802.11, base stations, for instance in cellular networks, relay stations, or other wireless nodes.

Communication capacities of conventional wireless networks, such as 802.11 or cellular networks, can be limited by interference. For example, the wireless medium is shared, and as a result, if two nearby devices transmit simultaneously, their transmissions typically interfere, preventing either device from delivering its packet. Recent advances in wireless technology have resulted in empirical wireless systems such as SAM, IAC and beamforming. These systems have demonstrated that concurrent transmissions across different transmitters in the same interference region are possible. The throughput in wireless networks employing these systems can be doubled or tripled.

However, such systems remain limited by the maximum number of antennas on an individual node, and cannot continuously scale the throughput as more transmitters join the systems. Conventional wireless networks, for example, 802.11 and cellular systems, may alleviate this problem by using all available channels or employing sectorized antennas. However, such techniques provide only a small constant gain that does not scale as the number of users increases. Furthermore, simply adding additional transmitters does not improve user throughput, because these transmitters interfere with each other.

There is a need for a wireless networking system that can scale throughput linearly as the number of users increases, yielding a fully scalable wireless network.

SUMMARY

In one aspect, in general, a distributed coherent transmission system enables transmissions from separate wireless transmitters with independent frequency or clock references to emulate a system where all the transmitters share a common frequency or clock reference. A technical problem with such an architecture is that the oscillator frequencies of the individual transmitters (i.e., those used to modulate/demodulate signals) are unlikely to be exactly the same from transmitter to transmitter, which can result in phase synchronization problems. For example, a difference as small as 100 Hz in the oscillator frequencies of two transmitters can cause a phase difference of it $\pi$ radians in the signals transmitted by the two transmitters after a short period of 5 ms. Such a phase difference can cause significant degradation in the ability of the two transmissions to remain coherent even across the duration of a single packet. This problem is alleviated by compensating for frequency and/or phases differences between transmitters by suitably precoding signals before modulation at one or more of the transmitters.

In various examples, the transmitters are access points (APs), for instance in 802.11, base stations, for instance in cellular networks, relay stations, or other wireless nodes. In the rest of this document, unless explicitly indicated otherwise, the term transmitter is used broadly to refer to any of these kinds of transmitting nodes.

In another aspect, in general, such a distributed coherent transmission system is part of a distributed MIMO architecture. In such a distributed MIMO architecture multiple individual transmitters emulate a single multi-antenna MIMO transmitter without requiring a common frequency or clock reference to be available to all transmitters. In some examples, the transmitters are able to communicate with each other using relatively high speed connectivity such as a wired backhaul (for example, in 802.11 APs, or cellular base stations) or a wireless medium (for example, bluetooth, IR, 802.11 in mobile devices using a cellular uplink), and use such connectivity to exchange the data they need to communicate to the receivers, as well as some minimal control information. The transmitters can then utilize traditional MIMO techniques to perform, for instance, beamforming, or nulling, at multiple receivers.

In another aspect, in general, such distributed coherent transmission enables independent transmitters to implement a variety of schemes in the information theory literature that assume that such independent transmitters share a common frequency or clock reference. Such schemes might include, for instance, lattice codes in a wireless mesh network, superposition coding on a wireless uplink, interference alignment across distributed transmitters, or distributed dirty paper coding/cognitive schemes from independent transmitters.

In some examples, channel estimates from the transmitters to receivers are formed based on coordinated transmissions from the transmitters (i.e., including compensation for frequency and/or phase differences) with channel-related information being returned from the receivers. Such channel information may be used at each of the transmitters to form combinations of data to direct transmission to particular receivers, for instance, using a distributed MIMO approach (allowing the multiple transmitters to perform, say, beamforming or nulling, at one or more receivers). In some examples, channel estimates from the transmitters to the receivers are computed by the receivers using transmissions from the transmitters, and explicitly communicated back to the transmitters. In other examples, channel estimates from the transmitters to the receivers are formed or updated based on reverse transmissions from the receivers to the transmitters using a reciprocity approach to determine channel characteristics from the transmitters to the receivers. In yet other examples, a combination of channel estimation approaches is used, for example, obtaining initial channel estimates from transmitters to receivers by explicit communication from receivers, and updating existing channel estimates from transmitters to receivers based on transmissions (e.g., acknowledgements) from the receivers to the transmitters.

In another aspect, in general, a system enables a distributed set of transmitters to emulate a multi-antenna transmitter approaching performance achievable with a common oscillator frequency. In some examples, this is accomplished by one or more slave transmitters using their respective receiver modules to monitor the transmissions of a master transmitter.

The monitored transmissions of the master transmitter are used by the receive module of each slave transmitter to estimate a characteristic (e.g., a time varying part of a phase offset between oscillators) between the master transmitter and the slave transmitter. The monitored transmission from the master transmitter, along with the estimated channel characteristic is used by each slave transmitter's receiver module to determine an oscillator frequency offset (and optionally phase offset) between the oscillator of the master transmitter and the oscillator of the slave transmitter. The determined oscillator frequency offset and phase offset at each slave transmitter is used by the slave transmitter's transmitter module to compensate transmissions.

In another aspect, in general, a method for operating a slave transmitter to provide coordinated transmission with a master transmitter includes forming a signal for concurrent modulation from the slave transmitter with a transmission of the signal from the master transmitter. An estimate of a time-varying phase offset between a modulation frequency of a transmission from the master and a frequency reference at the slave transmitter based on transmissions received at the slave transmitter from the master transmitter is maintained at the slave transmitter. The signal is modified prior to modulation according to the estimate of the time-varying phase offset and then modulated according to the frequency reference at the slave transmitter. The signal modulated at the master transmitter is transmitted from the master transmitter and concurrently with the transmission of the modulated modified signal from the slave transmitter.

In another aspect, in general, a slave transmitter estimates the change in phase offset at any receiver relative to signals from a master transmitter based on transmissions from the master transmitter received at the slave transmitter. Estimating the change in phase offset includes demodulating a transmission from the master transmitter, and comparing the demodulated transmission to expected demodulated values.

In some examples, the transmission from the master transmitter includes preamble of a transmission of the signal from the master transmitter.

In another aspect, in general a slave transmitter monitors a frequency offset relative to a master transmitter while concurrently transmitting with the master transmitter by coordinating periods of transmission and periods of silence during joint packet transmission.

In another aspect, in general, a slave transmitter monitors a frequency and/or phase offset relative to a master transmitter while simultaneously transmitting with the master transmitter by using a subset of antennas on the slave transmitter for cancelling the interference from simultaneous transmission.

In another aspect, in general, a slave transmitter and master transmitter each continuously track channel estimates to a receiver without requiring periodic communication of channel information from the receiver.

In some examples, the approach includes forming a signal for concurrent modulation from the slave transmitter with a transmission of the signal from the master transmitter, maintaining an estimate of a time-varying phase offset between a transmission from the master and a transmission at the slave based on transmissions received at the slave transmitter from the master transmitter and modifying the signal prior to modulation according to the estimate of the time-varying phase offset; and modulating the modified signal according to the frequency reference at the slave transmitter.

In some examples, the approach includes concurrently transmitting the signal modulated at the master transmitter from the master transmitter and the modulated modified signal from the slave transmitter.

In some examples, the data carried by the transmissions from the master and slave transmitters is the same, and the slave transmitters (and potentially the master) modify their transmitted signal(s) to increase the strength (SNR) of the signal at a particular receiver.

In some examples, the data carried by the transmissions from the master and slave transmitters is intended for different receivers, and can be different, and the master and the slave transmitters modify their transmitted signals to allow each of their intended receivers to receive their intended data without interference from the other transmissions.

In some examples, acknowledgments from receivers are utilized for transmission from a previous data packet to constantly update channel estimates to the receiver and for allowing the master and/or slave transmitters to modify their transmitted signals prior to modulation at both master and slave transmitters.

In another aspect, in general, a master transmitter includes a first oscillator for operating at a first oscillator frequency, a first transmitter module for transmitting symbols, the first transmitter module being coupled to the first oscillator for operating at the first oscillator frequency a slave transmitter, each slave transmitter of the one or more slave transmitters including a second oscillator which operates at a second oscillator frequency a receiver module for receiving transmissions from the master transmitter, the receiver module operating at the second oscillator frequency and including a phase and frequency offset tracking module for determining a frequency offset between the first oscillator frequency and the second oscillator frequency based on the transmissions received from the master transmitter, and a second transmitter module for transmitting symbols, the second transmitter module operating at the second oscillator frequency and including a phase and frequency offset compensation module for compensating for the frequency offset before transmitting symbols.

DESCRIPTION

1 Overview

The system described herein allows N single-antenna transmitters with independent frequency and clock references to emulate a system where the N transmitters have access to a common carrier reference with a consistent phase and frequency across access points. This allows the N single-antenna transmitters to emulate, for instance, a single N-antenna multiple-input multiple-output (MIMO) transmitter. The emulated N-antenna MIMO transmitter can transmit N concurrent streams that do not interfere with each other, delivering N concurrent streams to N users by beamforming, nulling, or more general Multiple-Input-Multiple-Output (MIMO) techniques, for instance, nulling at particular receivers while transmitting fewer than N streams. Such a system could be deployed, as an example, in a large room (e.g., a conference center) or an outdoor setting (e.g. a dense urban area) to provide tens or hundreds of transmitters that enable concurrent transmission of a commensurate number of data streams without interference. More generally, some or all of the multiple transmitters and some or all of the user devices may have multiple antennas.

In various examples discussed below, the "transmitters" (or "source stations") can be various types of nodes in a communication network that function, at least in part or at some times, as transmitters. The "transmitters" generally include transmitter and receiver components, and are referred to as "transmitters" in their role as transmitting one or a subset of the coherent transmissions to client "receivers" (or "destination stations"), which also generally include transmitter and receiver components, and a referred to as "receivers" in their role as receiving the multiple coherent signals from multiple "transmitters". Such transmitters can include, without limitation, wireless Ethernet infrastructure access points (APs), for instance in 802.11n access points, wireless repeater stations, base stations, for instance in cellular networks, relay stations, or other wireless nodes. In the rest of this document, unless explicitly indicated otherwise, the terms "transmitter" and "access point" is used broadly to refer to any of these kinds of nodes that transmit to other wireless stations.

For a client receiver (referred to simply as the "client" or "receiver" in some instances below) to decode its intended signal without interference, it is desirable that the N−1 signals intended for the other clients cancel (i.e., destructively interfere with) each other at that client. For cancellation to occur, each transmitter controls the phase (and magnitude) of its transmitted signals such that cancellation is achieved at every unintended client, for every transmitted symbol. Controlling the phase between transmitted signals is relatively simple for a single N-antenna transmitter when all of the transmit antennas share the same oscillator. In contrast, in a distributed setting, the transmit antennas are on different transmitters, and hence each transmit antenna is connected to a different oscillator. Different oscillators naturally have unknown phase shifts with respect to each other. Furthermore, since different oscillators never have the same exact frequency, and since different transmitters might independently choose to turn off their oscillators, for instance, to reduce operating power, these phase shifts change over time. Enforcing the consistent phase synchronization in this distributed setting is highly challenging.

It should be understood that although certain discussion below focuses on transmitters each with a single antenna, the approaches are applicable where some or all of the transmitters have multiple antennas controlled according to common oscillators. In such cases, within one transmitter, the signals transmitted from that transmitter's antennas naturally maintain consistent phase relative to one another by virtue of the use of the common oscillators. For example, N 2-antenna access points could therefore emulate a 2N-antenna access point.

Figure 1A:
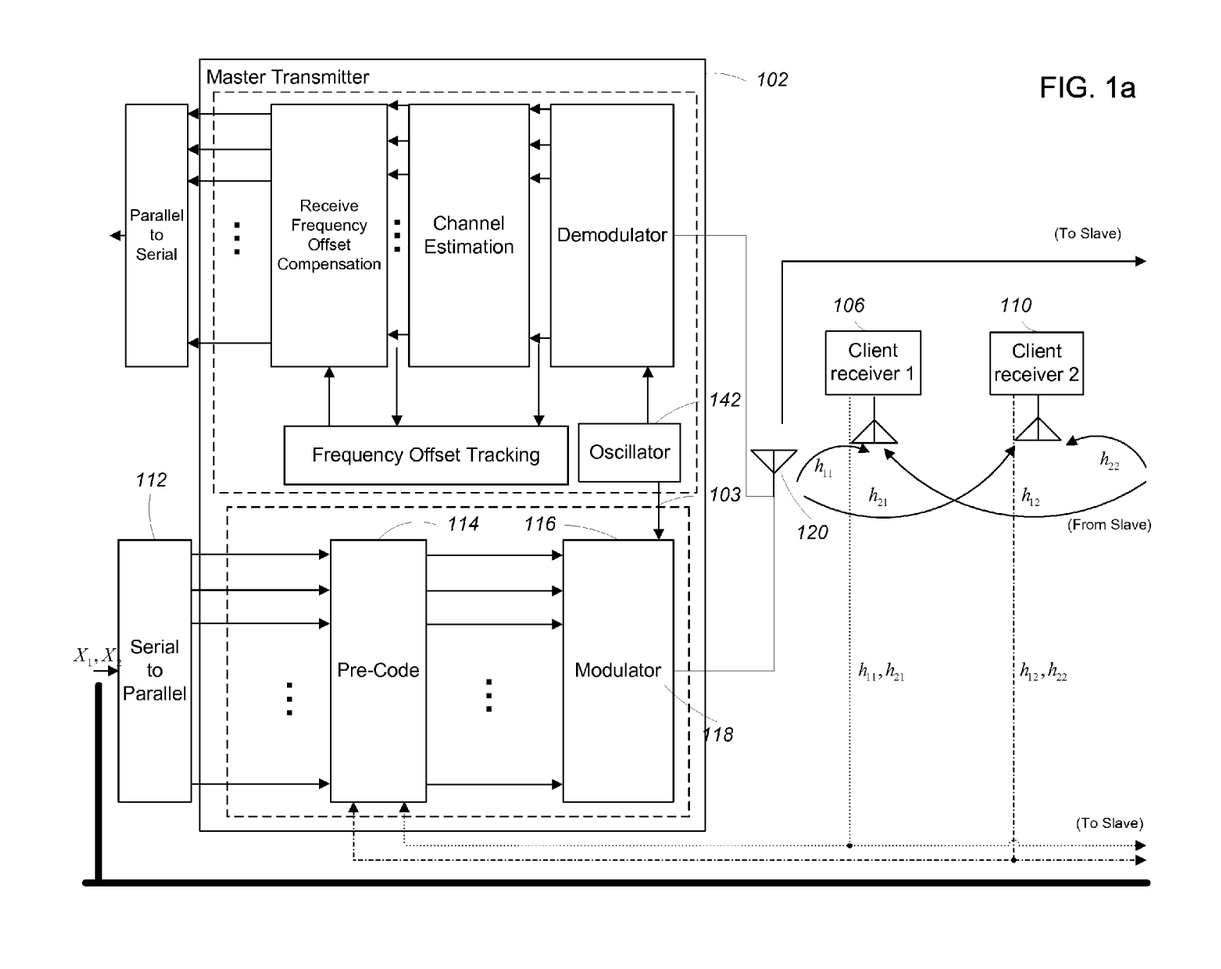
FIG. 1a is a master transmitter.
Figure 1B:
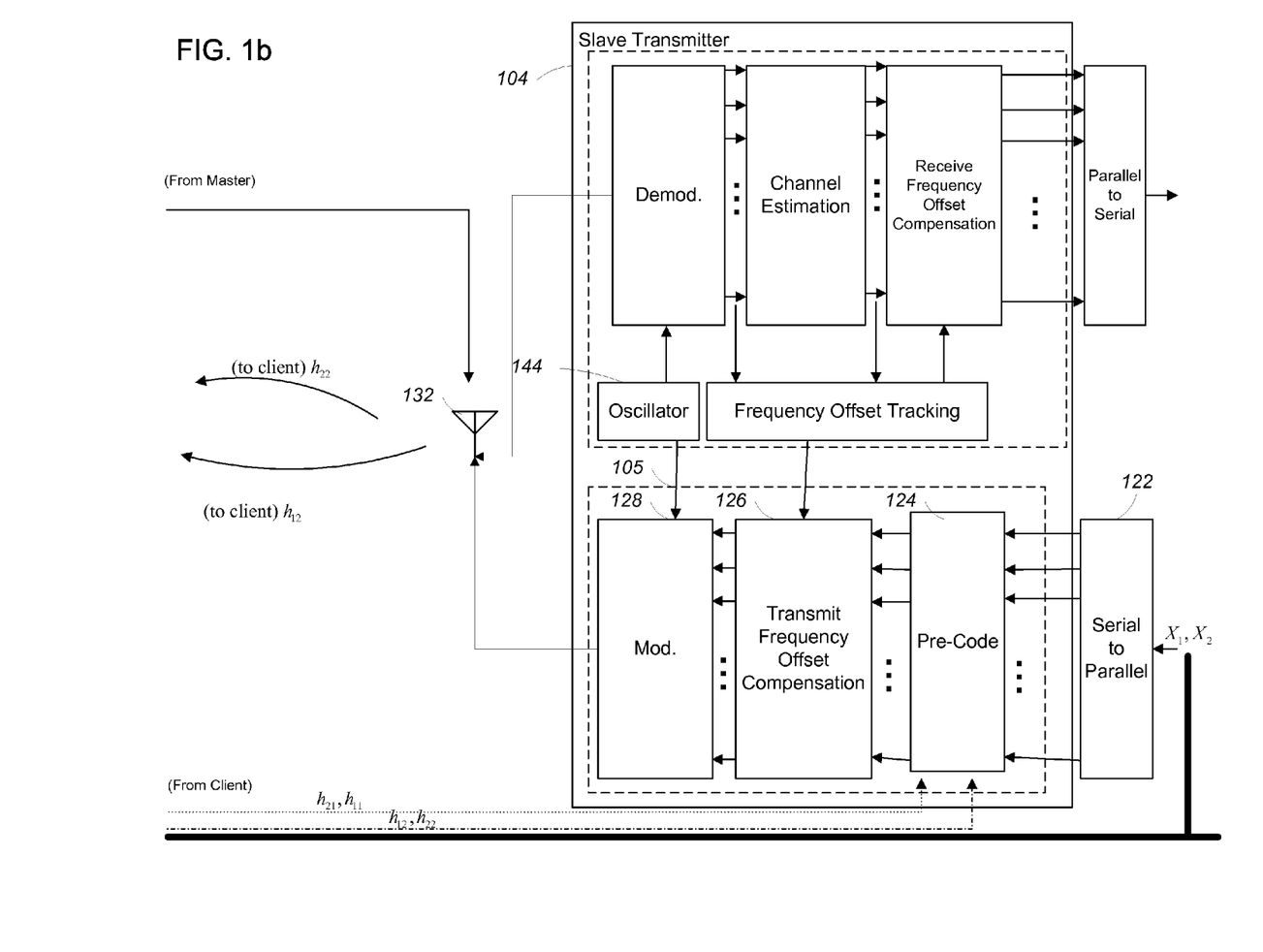
FIG. 1b is a slave transmitter.

Referring to FIGS. 1a and 1b, in an illustrative example (e.g., N=2 transmitters, recognizing that the approach is applicable to much larger numbers of access points and client receivers) a single antenna master transmitter 102, a single antenna slave transmitter 104, and two single antenna client receivers 106, 110 are configured to communicate wirelessly over a shared medium. Note that the antennas as shown as coupled to both transmitter and receiver sections at the devices, with coupling and/or switching circuitry not shown. The master transmitter 102 controls concurrent transmission of two data frames, $X_1$ and $X_2$, to the two receivers, respectively. The signals emitted from the antennas of the master transmitter and the slave transmitter are synchronized to achieve the desired constructive and destructive interference at the antennas of the receivers.

In this example, both the master transmitter and the slave transmitter have access to the data frames $X_1$ and $X_2$ that are to be transmitted to the receivers. For instance, each transmitter may have received the data frames over a wired network (or wireless network, say on the same or different frequencies) linking the transmitters.

Referring to FIG. 1a, to transmit the two frames, the master transmitter 102 receives a data frame (i.e., receives the data packet for the payload to be transmitted in the frame) and provides the data to a master parallelization module 112. The master parallelization module 112 parallelizes the stream of symbols into K sequences, for example $X_1$ to $x_{1,0}^{(k)}, x_{1,1}^{(k)}, x_{1,2}^{(k)}, \ldots$ for $k=0,\ldots,K-1$, of values represented by complex values (symbols) from a fixed constellations (e.g., QAM constellations). As outlined below, each of the sequences will be modulated to a different frequency in an Orthogonal Frequency Division Multiplexing (OFDM) approach.

The master parallelization module 112 outputs the mapped symbols $x_{1,0}^{(k)}, x_{1,1}^{(k)}, x_{1,2}^{(k)}, \ldots$ for the first receiver and the mapped symbols $x_{2,0}^{(k)}, x_{2,1}^{(k)}, x_{2,2}^{(k)}, \ldots$ for the second receiver to a master pre-coding module 114 in a master transmit portion 103. The master pre-coding module 114 also receives channel transfer functions representing the channels from the transmit antennas of each transmitter 102, 104 to the (receive) antennas of each of the receivers 106, 110. Since there are two transmitters and two receivers in the system of FIG. 1, there are four channel transfer functions for each: $h_{11}$, $h_{12}$, $h_{21}$, $h_{22}$. $h_{11}$ is the channel transfer function from the master transmitter 102 to the first receiver 106. In general, the transfer function for each frequency component is a separate complex number, but the k-dependence is omitted from the notation for clarity and/or the channel $h_{ij}$ can be considered to be a K-dimensional complex vector. $h_{21}$ is the channel transfer function from the master transmitter 102 to the second receiver 110. $h_{12}$ is the channel transfer function from the slave transmitter 104 to the first receiver 106. $h_{22}$ is the channel transfer function from the slave transmitter 104 to the second receiver 110.

Considering a single frequency component k (and omitting the k dependence in the notation below), the master pre-coding module 114 pre-codes the mapped symbols based on the channel transfer functions $h_{11}, h_{12}, h_{21}, h_{22}$ to produce the combined precoded symbols $y_{1,0}, y_{1,1}, \ldots$ such that the mapped symbols are received in combination with the transmission from the slave transmitter at the antenna of the first receiver 106 to provide $x_{1,0}, x_{1,1}, \ldots$ and cancel $x_{2,0}, x_{2,1}, \ldots$ while providing $x_{2,0}, x_{2,1}, \ldots$ at the antenna of the second receiver 110 and cancelling $x_{1,0}, x_{1,1}, \ldots$ Conventional MIMO techniques are implemented by the master pre-coding module 114 and will not be discussed further herein.

The output of the master pre-coding module 114 is provided to a master modulation module 116 which converts each of the mapped, pre-coded symbols into a time domain waveform. At least conceptually, a baseband time waveform is formed such that effectively the $k^{th}$ component is modulated to a frequency $k\gamma_1$, where the factor $\gamma_1$ depends on the sampling rate of the conversion to a time signal in the modulator and is substantially proportional to the desired sampling frequency $\gamma_s$. The master modulation module is driven by the master modulator 116, which produces a carrier signal substantially at the desired carrier frequency $\omega_c$, and more precisely representing modulation of the $k^{th}$ input by the complex sinusoidal signal $\exp j((\omega_1(t)+k\gamma_1(t))t)$ such that $\omega_i(t) \approx \omega_c$, $\gamma_i(t) \approx \gamma_s$, and $\omega_i(t)$ and $\gamma_i(t)$ may be slowly varying. The output of the master modulation module 116 is a time domain signal including a sum of N orthogonal sub-carriers, each sub-carrier carrying one symbol. The output of the master modulation module 116 is provided to a master antenna 120.

Referring to FIG. 1b, the transmit portion 105 of the slave transmitter 104 transmits symbols in much the same way as the master access point 102. However, as introduced above, the slave access point has a separate oscillator 144, which is used to modulate transmissions from the slave access point. The slave oscillator 144 produces a carrier signal substantially at the desired carrier frequency $\omega_c$, and more precisely representing the complex sinusoidal signal $\exp j((\omega_2(t)+k\gamma_2(t))t)$ such that $\omega_2(t) \approx \omega_1(t) \approx \omega_c$, $\gamma_1(t) \approx \gamma_2(t) \approx \gamma_s$, typically with $\omega_1(t) \neq \omega_2(t)$, and $\gamma_1(t) \neq \gamma_2(t)$ These differences are explicitly accounted for as described below.

At each of the master and slave, a demodulator on the received path makes use of the same oscillator (142, 144), and therefore differences between the oscillators are manifested both on the receive and transmit paths of the access points.

In order to emit coordinated (e.g., coherent) transmissions from the multiple access points, two issues are addressed:
 a. Synchronizing transmissions from multiple access points such that they maintain a consistent relative phase within a single simultaneous frame transmission; and
 b. Determining channel estimates, which are consistent with the consistent relative transmission phases, between access points and clients such that MIMO techniques can be applied to precode transmissions such that multiple data streams can be transmitted to their intended destinations during the simultaneous transmissions.

For the first of these issues, it is important to note that simply correcting for oscillator frequency may result in a consistent phase within one frame transmission. However, small errors in estimate of the difference in oscillator frequency can result in the relative phase of the simultaneous transmissions varying from frame to frame, thereby making it difficult to maintain an estimate of the channels from the access points to the clients that are valid for long enough to be useful.

Therefore, the approach to synchronization addresses both compensation for frequency offset and phase offset at each frame transmission and adjusting the phase for successive symbols in the transmission of the frame. The general approach is to make use of a synchronizing frame transmission from a lead access point that is received by one or more slave access points shortly before the simultaneous transmission to clients by the lead and the one or more slave access points. Generally, and as explained in more detail below, the slave access points use the received synchronizing transmission from the lead access point to compensate their simultaneous transmissions to achieve their consistent fixed relative phase to the lead access point.

The issue of determining channel estimates from the access points to the clients can be addressed in a variety of ways. Some approaches make use of clients that are aware that transmissions emit from multiple access points, and with suitable coordination provide feedback to the access points to permit estimation of the downlink channels and application of MIMO techniques for subsequent downlink transmissions from the access points.

2 Principles of Operation

Before discussion of specific embodiments, a number of principles of operation are described in a specific context of two single-antenna access points, one a master and one a slave, which communicate with two single-antenna clients. It should be understood that this is a very simple illustrative example, and that the principles of operation extend naturally to more than two access points, and to access points and clients each with multiple antennas.

Figure 2:
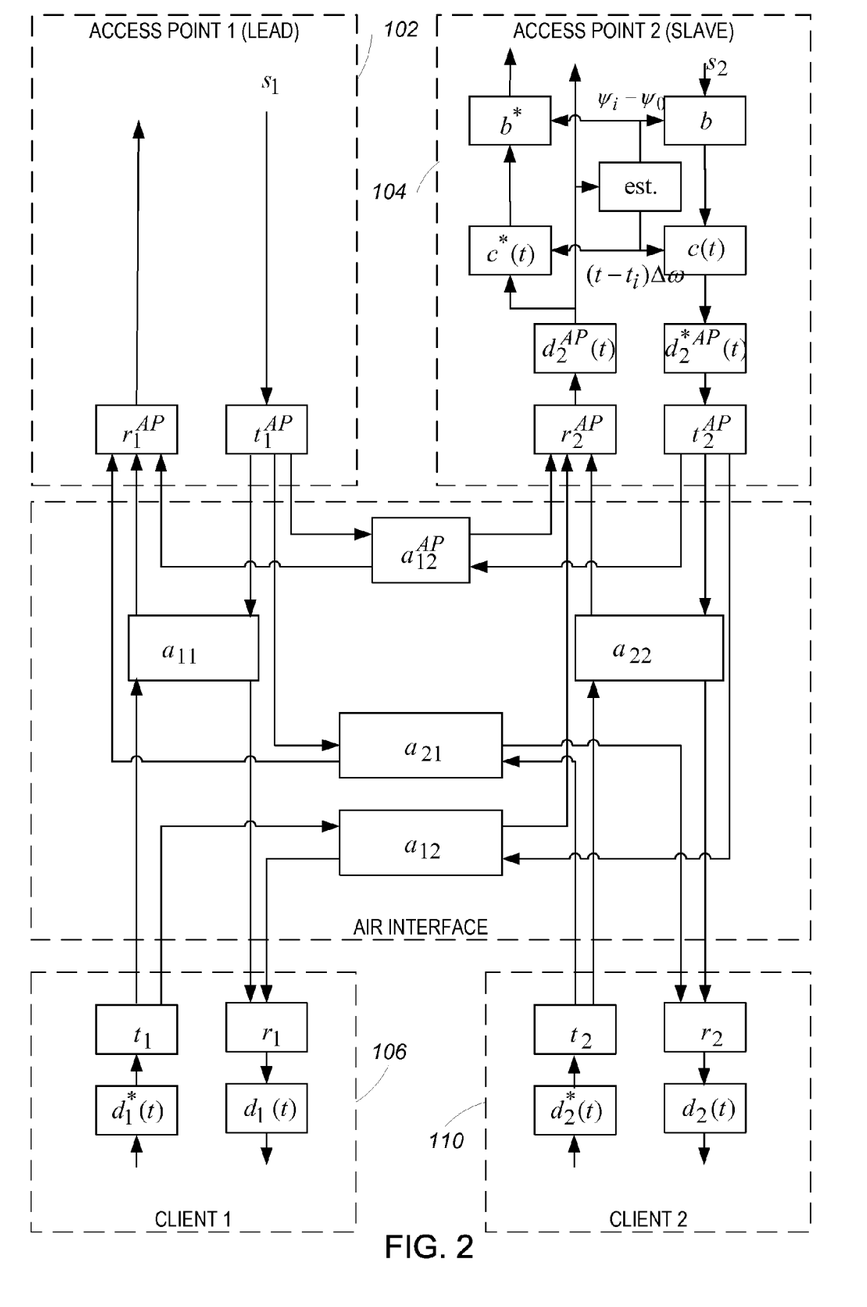
FIG. 2 is a block diagram of a model of baseband transmission paths.

Referring to FIG. 2, signal paths from between access points and clients can be decomposed into their equivalent baseband components as shown. FIG. 2 shows input signals (i.e., complex values) $s_1$ and $s_2$, which are transmitted from the lead access point 102 and slave access point 104 such that they combine to form (scaled versions of) desired signals $x_1$ and $x_2$ at clients 106 and 110, respectively. Signals $s_1$ and $s_2$ are representative values at a particular frequency (k), at a time offset within a transmission frame—but for clarity of explanation the frequency and time dependence are omitted from the notation.

The input signals are determined using conventional MIMO techniques based on channels estimates between the access points and the clients, for examples as $(s_1,s_2)^T = H^{-1} (x_1,x_2)^T$, or more generally a power limited version, for example $(s_1,s_2)^T = \beta H^{-1} (x_1,x_2)^T$ where $\beta$ is chosen to satisfy power constraints at the master and/or slave access points. One aspect discussed below is an approach to determining suitable entries for the channel matrix H such that the signals $s_i$ yield the desired combinations at the clients. The application of $H^{-1}$ is not shown in FIG. 2.

The components of the signal paths are shown in detail in FIG. 2, however, in operation it is not necessary to consider each component individually, and the system in FIG. 2 does not necessarily correspond to the physical structure, while still providing a basis for describing the procedures used.

At the lead access point 102, in the transmit path, the hardware (e.g., amplifier, antenna, antenna-air interface, etc.) introduces a complex (generally time-invariant) gain $t_1^{AP}$. Note that FIG. 2 illustrates a single frequency component, and therefore the gains shown in the figure are generally dependent on the frequency. Similarly, the receive path includes a gain $r_1^{AP}$. Note that in general, the (complex) gains on the transmit and receive paths are not equal. The slave access point 104 similarly has transmit and receive path gains $t_2^{AP}$ and $r_2^{AP}$, respectively.

In addition, as introduced above, the receive path at a slave includes a time varying, unit gain, "rotating" phase component, which can be approximated as $d_2^{AP}(t) \approx \exp j(\theta_n + (t-\tau_n)\Delta\omega_n)$ near time $\tau_n$, which represents the mismatch between the oscillator frequency and the sampling frequency at the slave access point relative to the master access point. Because the same oscillators and sampling clocks are used on the output path of the slave access point, the output path also includes a rotating phase component $d_2^{AP}(t) \approx \exp(-j(\theta_n + (t-\tau_n)\Delta\omega_n))$, with rotating phase components that are rotating in the opposite direction than on the receive path. (Note that the term $\Delta\omega_n$ is in general dependent on the frequency component k, for example reflecting both the oscillator frequency offset, as well as factors that depend on the sampling frequency for the modulation and demodulation.)

As illustrated, the clients similarly have transmit and receive path gains, $t_i$ and $r_i$, as well as rotating phase components $d_i(t)$ that account for the mismatch of the client oscillators and sampling clocks.

The over-the-air paths between access points i and j are shown as $a_{ij}^{AP}$ and are assumed to be reciprocal. Similarly, the reciprocal path between access point i and client j is shown as $a_{ij}$.

2.1 Slave Transmit Compensation for Oscillator Frequency and Phase Offset

Referring again to the slave access point 104, when the slave access point receives a transmission from the master access point, known values ("pilot symbols") in the transmission allow the slave to determine a magnitude and a phase of the path from the master to the slave. This path is considered to have a relative constant part with gain $r_2^{AP} a_{12}^{AP} t_1^{AP}$ as well as the part $d_2^{AP}(t)$, which as introduced above is modeled locally as $d_2^{AP}(t) \approx \exp j(\theta_n + (t-\tau_n)\Delta\omega_n)$. When the slave receives a transmission at time $\tau_n$, it cannot distinguish between the phase introduced by relatively constant part, but can approximate the total phase as $\angle(d_2^{AP}(t)r_2^{AP}a_{12}^{AP}t_1^{AP}) = \psi_n + (t-\tau_n)\Delta\omega_n$.

On the transmit path, the slave access point includes phase adjustment elements b and c(t) (which are implemented prior to the IDFT and modulation in the transmit path), that introduces an opposite phase of the expected time varying phase difference introduced on the output path by $d_2^{*AP}(t)$. Phase adjustment elements b and c(t) each have unit magnitude and together introduce the opposite phase of $d_2^{*AP}(t)$. At time $\tau_0$, b is initialized to unity, and c(t) is set such to unit magnitude with $\angle c(t) = (t-\tau_0)\Delta\omega_0$. Note that a value $s_2$ transmitted shortly after $\tau_0$ experiences a gain $d_2^{*AP}(t)c(t)b$, which is approximately a constant with unit magnitude and phase $-\theta_0$, prior to passing to the transmit path via the $t_2^{AP}$ block shown in FIG. 2. (Note that the relative phase of the signal provided to the transmit path at the slave via the $t_2^{AP}$ block as compared to the phase of the signal provided to the transmit path at the master via the $t_1^{AP}$ block is therefore $-\theta_0 + \angle(r_2^{AP}a_{12}^{AP}t_1^{AP}) = \psi_0 - 2\theta_0$.

At a subsequent time, $\tau_n$, when the slave access point receives another transmission from the master, the estimator determines new estimates $\psi_n$ and $\Delta\omega_n$ and updates b and c(t) such that $\angle b = \omega_n - \psi_0$ and $\angle c(t) = (t-\tau_n)\Delta\omega_n$. Note that the change in phase of the oscillator $\theta_n - \theta_0$ is equal to $\psi_n - \psi_0$ (assuming the phase of $r_2^{AP}a_{12}^{AP}t_1^{AP}$ has remained constant), therefore a new value $s_2$ transmitted shortly after $\tau_n$ (i.e., after the blocks b and c(t) are updated) again experiences a constant gain $d_2^{*AP}(t)c(t)b$, which is approximately a constant with unit magnitude and phase $-\theta_0$, prior to passing to the transmit path via the $t_2^{AP}$ block. (Note that as at the time shortly after time $\tau_0$, with the updated blocks b and c(t) and time $\tau_n$, the relative phase of the signal provided to the transmit path at the slave via the $t_2^{AP}$ block as compared to the phase of the signal provided to the transmit path at the master via the $t_1^{AP}$ block is maintained as $-\theta_0 + \angle(r_2^{AP}a_{12}^{AP}t_1^{AP}) = \psi_0 - 2\theta_0$.)

2.2 Coherent Transmission from Master and Slave Access Points

Coherent transmission of values $s_1$ and $s_2$ from the master and the slave access points, respectively, is accomplished by the master access point first sending a synchronizing transmission (i.e., a sequence that includes known symbols) to the slave at a time $\tau_n$. As described above, the slave access point updates its compensation terms according to $\psi_n$ and $\Delta\omega_n$ from that received synchronizing transmission.

At a known time delay, at time $\tau_n + \Delta\tau$, the master and the slave concurrently transmit $s_1$ and $s_2$ respectively (i.e., these symbols are transmitted as part of a larger frame). These transmissions pass to the transmit blocks $t_1^{AP}$ and $t_2^{AP}$ at a fixed relative phase throughout the transmission, so there is no phase rotation between the two signals. Furthermore, successive transmissions experience the same relative phase as outlined above (i.e., relative phase $\psi_0 - 2\theta_0$). This latter feature is significant in that channel estimates from the slave access point to the clients are not affected by change in the slave oscillator phase and frequency offsets from the master.

It is important to recognize that the slave access point may experience a delay in detecting the transmission from the master access point. For example, suppose it detects the transmission $\delta\tau$ late, and then makes its transmission at time $\tau_n + \Delta\tau + \delta\tau$. Because of the late detection of the known symbols in the transmission form the master, the slave's estimate of the phase is increased by $\delta\psi$, and the increase in the phase of the compensation term b exactly compensates for the late transmission from the slave, thereby the approach is essentially insensitive to the amount of detection delay.

2.3 Slave Receiver Compensation for Oscillator Frequency and Phase Offset

On the receive path at the slave access point, a similar compensation for oscillator phase and frequency offset can be accomplished by effectively multiplying the received signal by $b^*c^*(t)$. For example, in the time vicinity of $\tau_0$ when a signal is received (e.g., from a client), the gain of the compensated path $b^*c^*(t)d_2^{AP}$ has approximately unit magnitude and phase $\theta_0$. Again, in the time vicinity of a subsequent update at time $\tau_n$, the phase of this compensated path remains approximately $\theta_0$.

2.4 Access Point to Client Channels

The effective baseband signal path from the master access point (j=1) to client i is $g_{i1} = d_i(t)r_i a_{i1} t_1^{AP}$. If the client uses known values in the transmission to compensate for its oscillator phase and frequency offsets, then the effective channel is $\tilde{g}_{i1} = r_i a_{i1} t_1^{AP}$ Assuming that the slave access points compensate for their rotating transmit phase relative to the master as described above, and the correction terms remain accurate, the effective phase-corrected baseband signal path from the slave access point j to client i (i.e., taking into account the compensation of the input in the b and c(t) blocks) is $g_{ij} = d_i(t)r_i a_{ij} t_j^{AP} d_j^{*AP}(\tau_0)$, where $d_j^{*AP}(\tau_0) = \exp(-j\theta_0)$ is the effect of the initial phase measured at that slave access point and recorded at slave access point j. Again, if the client uses known symbols in the transmission to compensate for its oscillator phase and frequency offsets, then the effective channel is $\tilde{g}_{ij} = r_i a_{ij} t_j^{AP} d_j^{*AP}(\tau_0)$.

It is important to note that the channel estimates $h_{ij}$, which form the elements of the matrix H, are only required to be known to within a (complex) proportionality $\beta_i$, which depends on the destination client i. In the discussion below this proportionality constant defined such that $h_{ij} = \alpha_i g_{ij}$.

3 Coherent Transmission from Slave Access Points

Steps that lead up to concurrent transmission from the multiple access points consistent with the principles described above is therefore as follows. Note that there is an underlying assumption in these examples that the access points are linked by high-capacity backend channel (e.g., gigabit wired Ethernet). Frames intended for clients are distributed to all the access points through the shared backend channels, and the desired precoding of the frames (e.g., $H^{-1}$) is coordinated via the backend channel as well.

In this example, it is assumed that one access point has already been identified as the master access point, for example, because it was the first to power up or because it is particularly configured to act as the master. In this example, we assume that there are N−1 slave access points (numbered 2, . . . , N with the master being numbered 1), each with one antenna, which will participate in the simultaneous transmissions.

Initialization:
1) For each slave access point n=2, . . . , N, at a time $\tau_0^{(n)}$ the master sends an initial transmission to that slave, based on which the slave determines an initial phase offset $\psi_0^{(n)}$ for each frequency component (i.e., $\psi_0^{(n)}$) can be represented as a vector for all the frequency components) which it records. Note that these initializations are not in general concurrent for all the slave access points.

Concurrent Transmission from Access Points:
2) At a time $\tau_1$, the master transmits a synchronization frame directed to each of the slaves. We assume that via backend channel and/or via identifying information in the synchronization frame the slaves determine the desired frames $S_n$ to transmit from each of the access points.

3) At each of the slave access points n=2, ..., N:
   a) the transmission from the master is detected (recognizing that each slave may detect that transmission at a slightly different delay)
   b) the slave access point determines a new phase offset $\psi_1^{(n)}$ and frequency offset $\Delta\omega_1^{(n)}$ (i.e., estimates for each frequency component, although the estimates of $\Delta\omega_1^{(n)}$ may make use of information from a range of frequency component) based on which it configures it correction elements b and c(t).
c) a fixed delay after detection of the transmission from the master, the slave transmits the frame $S_n$ via its configured correction elements b and c(t)

As introduced above, the result of this correction is that each access point effectively maintains a fixed phase (provided to the transmit components $t_j^{AP}$) relative to the master.

Steps 2 and 3 are repeated in subsequent transmissions.

Note that step 2 is described above as a transmission of an entire frame to the slave. It should be understood that a preamble of a frame (e.g., a 802.11n legacy preamble) can be sufficient for the slave to synchronize and then join in with the transmission from the master, such that the preamble is transmitted from the master and the body of the frame is transmitted from the master and the slave. Such an approach can be compatible with wireless Ethernet standards, for example, in that automatic gain control and channel estimation is not performed until after the legacy preamble.

3.1 Multiple Antenna Access Points

Note that although the discussion addresses single-antenna access points, multiple antenna access points are addressed by making use of the observation that such multiple antennas make use of a common oscillator. Therefore, the procedures described above for one antenna can be extended to multiple antennas by making use of one antenna for receiving the synchronizing transmission from the master, or equivalently, a fixed combination (weighting) of multiple antennas, for example, providing a desirable receive sensitivity in the direction of the master access point. Each transmit stream is then compensated independently using the same estimated compensation terms (b and c(t)).

4 Client Feedback Based Channel Estimation

As discussed above, the master and slave access points can form coherent transmissions by the master access point first sending a synchronizing transmission and then at a fixed delay both master and slave sending transmissions to one or more clients.

Generally one approach to channel estimation involves a client receiving the concurrent transmissions and being able to identify components of the transmission from each of the access points that include known symbols, thereby allowing it to estimate the channels from each of the access points, and report those channels to the access points, which in turn compose the overall channel matrix H, which is then inverted and used to determine the values $s_i$ in subsequent transmissions.

One approach to permitting the client to identify the components from each of the access points is to interleave transmissions in time from each of the access points in a pattern known to the client such that at certain times each access point transmits alone include a known symbol. Because the transmission includes only one access point transmitting at a time, the client can determine each channel separately.

Another approach is for each of the access points to send a different set of linearly independent known values. For example, in the case of two simultaneous transmissions, if the master sends ($s_{11}$=z, $s_{12}$=z) and the slave sends ($s_{21}$=z, $s_{22}$=−z), the client effectively receives ($s_{11}\tilde{g}_{i1}+s_{21}\tilde{g}_{i2}$, $s_{12}\tilde{g}_{i1}+s_{22}\tilde{g}_{i2}$) from which it can solve for $\tilde{g}_{i1}$ and $\tilde{g}_{i2}$ to report back to the access points. More generally, $N_c$ linearly independent sequence of at least $N_c$ values are sent from multiple access points, and a client determines the relative channels (i.e., the channels to within an unknown complex scale factor) from each of the access points.

Note that channels to multiple clients may be determined in this manner, with the transmissions to different clients being made at different times, or optionally, the same transmissions from the access points being used by more than one client to estimate the channels. Furthermore, the sequence of transmissions with different subsets of antennas may be interleaved for different clients.

5 Alternatives 5.1 Resynchronization within a Packet

The approaches described above enable slave access points to accurately synchronize their phase with the lead access point at the beginning of data transmission, and then use an estimate of their phase and frequency offset to the lead access point to account for phase rotation within a packet. Alone, such a technique can lead to accumulative errors in phase within a packet, thus reducing SNR at the receivers, although the magnitude of these errors is smaller than in the initial phase rotation as they only accumulate within a packet, rather than across packets. If oscillator offset estimates are sufficiently accurate, these errors will be small enough that the SNR of the joint transmissions is unaffected for normal frame length. In this section, we describe techniques to track and compensate for oscillator offset errors during the duration of a frame, in cases where the errors are large enough to make a significant impact on the received SNR of the joint transmissions.

One alternative enables slave access points to compensate for errors in phase synchronization even through the duration of a packet. The basic idea is that slave access points listen to the lead access points transmission, estimate their current channel to the lead access point, and recalibrate their estimate of the lead access point's oscillator phase appropriately. The challenge with implementing this idea, however, is that slave access points cannot naively listen to the lead access point's transmission while simultaneously transmitting themselves, as the slave access points transmission power will overwhelm the ADCs on their receive chains. At least two different mechanisms can be used to enable slave access points to address this challenge, depending on whether or not slave access points can cancel the power of their own transmissions.

If the slave access points cannot cancel their own transmissions, which can happen when slave access points have only a single antenna, or when slave access points have multiple antennas but cannot expend the power to cancel their own signal (potentially because they are in a power limited regime), the access points use a scheme where slave access points periodically remain silent, and the lead access point transmits a known symbol during this silence to enable phase tracking. Specifically, the lead access point transmits a resync symbol every L data symbols. Slave access points do not transmit concurrently during this resync symbol. Instead, they compute the channel from the lead access point using this resync symbol, and use its difference from the channel computed using the previous resync symbol (or the synchronization header in the case of the first resync symbol) to resynchronize phase.

It may seem that using only one resync symbol would lead to noisy estimates of the channel at the slave access points, thus reducing their accuracy of resynchronization. However, the channel estimates can be denoised since it uses OFDM over a wideband channel. The phase rotations across OFDM subcarriers are correlated, and we can leverage this correlation to denoise the phase rotations even with one OFDM resync symbol.

Specifically, the slave access points use a technique motivated by OFDM fine phase tracking. A slave access point uses each resync symbol to estimate the current channel to the lead access point for each subcarrier. It then computes the phase difference between this channel and the channel computed from the previous synchronization symbol, for all subcarriers. The phase difference computed per subcarrier, but for noise, would lie along a line. This is because, as in standard fine phase tracking, the carrier frequency offset (CFO) between the lead and slave access point produces the same phase shift across subcarriers, while the sampling frequency offset (SFO) produces a phase shift proportional to subcarrier index. Thus, by fitting a line to the phase offsets, we can denoise the estimates of the phase change of the channel (from the lead access point to the slave access point) since the previous synchronization. The values on the line are the actual denoised phase changes for each subcarrier. These values can now be applied to the current estimate of $\Delta\phi_{1i}^{AP}$ for the corresponding subcarriers.

The value of L, i.e., the resync interval, depends on the maximum tolerable phase error, and the accuracy of frequency offset estimation. For an N×N system with a frequency offset error of 100 Hz, in order to sustain SNRs upto 25 dB, as required by an 802.11 system, it needs to insert resync symbols every $$\sqrt{\frac{10^{-2.5}}{N}} \times \frac{1}{100 \times 2\pi}$$

seconds. For a 10×10 system in 802.11g, this translates to an overhead of 1 resync resymbol every 7 data symbols, i.e., just 14%, with the overhead increasing only increasing as $\sqrt{N}$.

Note that while a SIFS after the synchronization header is necessary, a SIFS after the resync symbol is not. This is because, for the synchronization header, the slave access points need to compute the channel and phase estimates from this header before they can start transmitting. In contrast, in the case of a resync symbol, the slave access points already have reasonable estimates that they can use for transmitting their symbols, even as they compute the new estimates from the resync symbol in parallel.

The preceding mechanism enables slave access points to synchronize with the lead access point even when they cannot cancel their own transmissions, but requires them to obtain a reasonably good estimate of the initial frequency offset, and has overhead that increases, albeit slowly, with N. However, the system can take advantage of the ability of slave access points to perform cancelation using (1) additional carefully placed transmit antennas (but not additional tx/rx chains in hardware), (2) arbitrarily placed antennas with associated tx/rx chains, or (3) calibrated circuits between transmit and receive antennas The first case applies when each slave has a single transmit antenna and separate transmit and receive antennas. In that case, the slave can use a second "cancellation" antenna whose separation from the receive antenna is larger than the separation of the first transmit antenna from the receive antenna by half a wavelength. The second transmit antenna transmits the same signal as the first antenna, and the two signals will destructively interfere at the receive antenna. This will allow the receive antenna to receive signals from other transmitters (in particular the master) even while it is transmitting its own signal.

The second case applies when slaves have multiple transmit antennas, and receive antennas that could potentially be co-located with the transmit antennas. Let us consider a case with K transmitters, each with M antennas, and K receivers, each with N antennas. In such a case, each transmitter can transmit upto M−1 streams for a total of K(M−1) streams across all transmitters, while still ensuring that slaves can receive while transmitting. This is achieved as follows: One transmit antenna at each slave cancels the result of all the transmitted signals at one of the receive antennas on that slave (the slave might use more than one "cancelation" antenna in order to deal with any power mismatches between the transmission power required at the "cancelation" antenna to cancel all the transmitted signals). Note that the cancelation need not be perfect, but just needs to be sufficient for the slave to acquire a good enough signal from the master to perform frequency offset estimation. The slave can then use the signal received from the master on this receive antenna to perform frequency offset estimation from the master. Note that a single receive antenna is sufficient for the slave to track frequency offset from the master independent of the number of transmit antennas on the master (unlike in the case of full decoding where the slave would need as many receive antennas as the master uses to transmit). This is because all the transmit antennas on the master have the same oscillator frequency and hence there is only a single parameter to be estimated at the slave. The slave can potentially use additional receive antennas (using up to L receive antennas for simultaneous reception will require L "cancelation" antennas) to take advantage of channel diversity or robustness from multiple measurements.

The third case applies where the slave AP hardware uses circulators between transmit and receive antennas, as well as calibrated circuits between the different transmit and receive antennas to ensure that the transmitted signals from the different transmit antennas cancel out at a receive antenna. This solution does not require any additional transmit antennas at the slaves.

In all cases described above, the slave access point can receive the lead access point's transmission without self-interference from its own transmissions. However, the slave access point also needs to ensure that the lead access points transmissions are not interfered with by transmissions from other slave access points. The new approach ensures this by exploiting the idea of OFDM pilots, typically used for receiver tracking in single-user systems like 802.11. Only the lead access point transmits in the assigned OFDM pilot subcarriers. Using one or more of the cancelation techniques described above, each slave access point can receive the combined signal of the lead access point and other slave access points even as it transmits its own signal. It can then convert this received time domain signal to the frequency domain using a FFT, and perform phase tracking as before using only the OFDM pilot subcarriers. Since these subcarriers only contain transmission from the lead access point, it allows each slave access point to synchronize its phase with the lead access point using every data symbol. Further, since this scheme does not require resync symbols, it maintains the same packet format as regular OFDM, and therefore enables unmodified standard 802.11 receivers to decode the transmitted packets.

5.2 Diversity Gain

Versions of the system can provide both multiplexing and diversity gains. The description above focusses on multiplexing. The same discussion applies to diversity except that in this case, we have N access points transmitting a data symbol x to a single client. Similar to multiplexing, each access point i computes its channel, $h_i$, to the client. Slave access points also compute the channel from the lead access point, and perform distributed phase alignment prior to data transmission as described in §3. The only difference is that each access point, i, computes its symbol, $s_i$ as $$\frac{h_i^*}{\|h_i\|} x$$

where * is the complex conjugate operator.

5.3 Reciprocity

The distributed coherent system can also allow transmitters to estimate their channels to the receivers using receptions at the transmitter from the receiver, for example, acknowledgments sent by the receiver in response to packet transmission. This allows the distributed coherent system to eliminate the overhead from requiring receivers to transmit their estimates of the forward channel to the transmitters. The elimination of this overhead allows transmitters to constantly update channels from the receiver using packet receptions at transmitters, and thus enables the distributed coherent system to operate even in the presence of some degree of mobility.

A traditional N-antenna MIMO system in which the uplink and downlink operate on the same frequency bands can use channel reciprocity to estimate the forward channel from the transmit antennas to the receiver by using the reverse channel from the receiver to the transmit antenna and multiplying the reverse channel by a complex time-independent calibration constant. The estimate of the forward channel thus produced is correct up to a time dependent phase offset. In traditional MIMO systems, this phase offset is the same for all transmit antennas as they all share the same frequency reference, and hence does not affect the use of MIMO techniques such as beamforming, nulling etc. Specifically, consider a receiver with frequency offsets of $\omega^{Master}$ and $\omega^{Slave}$ respectively to a master transmitter and a slave transmitter. Let $H_{forw}^{Master}(t)$ be the forward channel from the master transmitter to the receiver, and $H_{rev}^{Master}(t)$ be the reverse channel from the receiver to the master transmitter at time t. Let $H_{tx}^{Master}$ be the channel introduced by the transmit chain at the master which can be assumed to essentially be time-independent or change very slowly with time, as it is comprised of the hardware elements on the node. Let $\theta_{Master}(t)$ be the phase of the transmitter's oscillator at time t, $H_{air,forw}^{Master}(t)$ be the passband channel over the air from the master transmitter to the receiver, $H_{rx}^{Receiver}$ be the channel introduced by the receive chain at the receiver, and $\phi_{Receiver}(t)$ be the phase of the receiver's oscillator at time t. Then, since a signal is upconverted at the transmitter, and downconverted at the receiver, we can express the composite channel $H_{forw}^{master}(t) = H_{tx}^{Master} \times H_{air,forw}^{Master}(t) \times H_{rx}^{Receiver} \times e^{j(\phi_{Master}(t) - \phi_{Receiver}(t))}$. Similarly, $H_{rev}^{master}(t) = H_{rx}^{Master} \times H_{air,rev}^{Master}(t) \times H_{tx}^{Receiver} \times e^{-j(\phi_{Master}(t) - \phi_{Receiver}(t))}$. By channel reciprocity, $H_{air,forw}^{Master}(t) = H_{air,rev}^{Master}(t)$. Let the calibration of the forward and reverse channels happen at time $t_0$, and let $K^{Master}$ be the corresponding measured calibration constant, which accounts for the differences in the channels corresponding to the transmit and receive chains on the transmitter and receiver, such that $H_{forw}^{Master}(t_0) = K^{Master} \times H_{rev}^{Master}(t_0)$. Due to the frequency offset between the master transmitter and the receiver, their oscillator phases change relative to each other by $\Delta\omega^{Master}\Delta t$, where $\Delta\omega^{Master} = \omega^{Receiver} - \omega^{Master}$ and $\Delta t = t - t_0$. Thus, we have that $(\phi_{Receiver}(t) - \phi_{Master}(t)) = (\phi_{Receiver}(t_0) - \phi_{Master}(t_0)) + \Delta\omega^{Master}\Delta t$. Combining with the calibration equation, we therefore have that $H_{forw}^{Master}(t) = K^{Master} \times H_{rev}^{Master}(t) \times e^{2j\Delta\omega^{Master}\Delta t}$. Similarly, we have that $H_{forw}^{Slave}(t) = K^{Slave} \times H_{rev}^{Slave}(t) \times e^{2j\Delta\omega^{Slave}\Delta t}$. In the case of a traditional MIMO system, where the master transmitter and slave transmitter are driven by the same clock and frequency reference, $\Delta\omega^{Master} = \Delta\omega^{Slave} = \Delta\Omega$. In this case, computing the forward channel from the transmitter to the receiver by simply multiplying the reverse channel from the receiver to the transmitter by the calibration constant, i.e., as $H_{forw}^{Master}{}_{Computed}(t) = K^{Master} \times H_{rev}^{Master}(t)$ (and similarly for the slave) incurs the same phase error $2\Delta\Omega\Delta t$ relative to the actual forward channel for all transmitters. MIMO techniques that are only sensitive to the relative phases between the transmitters at the receiver (for example, beamforming, nulling), but not the actual phases themselves, do not need to account for this phase difference in the case of traditional MIMO, as the relative phase between the computed forward channels is the same as the relative phase between the actual forward channels.

However, in a distributed setting, different transmitters have different frequency offsets from the receiver, and hence experience different phase offsets. As a result, the master transmitter will experience a phase error of $2\Delta\omega^{Master}\Delta t$ relative to the receiver, and the slave transmitter will experience a phase error of $2\Delta\omega^{Slave}\Delta t$ relative to the receiver. Let the frequency offset between the transmitters, $\omega^{Slave} - \omega^{Master} = \Delta\omega$. If the transmitters now compute the forward channels as before, then the computed forward channels will have a different relative phase as compared to the actual forward channels. Specifically, the relative phase between the computed channels, $H_{forw}^{Slave}{}_{Computed}(t) - H_{forw}^{Master}{}_{Computed}(t)$, will differ from the relative phase between the actual channels, $H_{forw}^{Slave}{}_{Actual}(t) - H_{forw}^{Master}{}_{Actual}(t)$ by $-2\Delta\omega\Delta t$. This will lead to significant degradation in the performance of MIMO techniques if the traditional mechanism of computing forward channels described above is used.

The distributed coherent system can exploit reciprocity by applying a frequency and phase offset of the received signal at slave transmitters such that they emulate the receive oscillator of the master transmitter. They can do this in a manner analogous to the phase and frequency offset compensation of the modulated transmission at the slaves. More precisely, at the time of reception of the reverse transmission from the receiver, the slave transmitter computes its phase offset relative to the master transmitter. The slave transmitter can do this in a manner similar to the computation of phase offset for the forward transmission—it can estimate the current phase offset using the phase of a prior transmission (e.g., data packet or synchronization signal) from the master transmitter. As mentioned previously, this phase offset $\Delta\psi$ represents the value $\Delta\omega\Delta t$. The slave can then compute the correct estimate of the forward channel by modulating the received signal by $e^{2j\Delta\omega\Delta t} = e^{2j\Delta\psi}$ prior to decoding and computing the estimate of the reverse channel. The reverse channel thus estimated after this phase correction can be used for future coherent transmissions.

This computation of the forward channels from a transmitter by multiplying the reverse channel estimate by $e^{2j\Delta\psi}$ is accompanied by an update of the reference channel phase (previously defined above as $\psi(t_0)$) between the master transmitter and the slave transmitter. In other words, this instant can be considered as the $t_0$ for future transmissions. Alternatively, the slave transmitters can multiply the reverse channels by $e^{j\Delta\psi}$ and retain their prior estimate of the reference channel phase between the master transmitter and the slave transmitter.

In some examples, the forward and reverse channels between a transmitter and receiver pair at some time t are calculated by the following mechanism. First, the receiver receives a transmission from the transmitter at time t from the transmitter and evaluates the channel $H_{forw}(t)$ and conveys this information to the transmitter (for e.g. in the acknowledgement). The receiver then responds with another transmission (e.g. an acknowledgement) at time t+δt, where δt is a short time duration. The transmitter then evaluates the reverse channel $H_{rev}(t+\delta t)$ from the receiver. The transmitter can now estimate $H_{rev}(t)$ from $H_{rev}(t+\delta t)$ by compensating for the carrier frequency difference $\Delta\omega$, and the sampling frequency difference $\Delta\gamma$, between the transmitter and receiver accumulated over time δt. This can be done by modulating the signal received at the transmitter by $\exp(j\delta t(\Delta\omega+k\Delta\gamma))$ in subcarrier k. In some implementations, the transmitter can compute the calibration constant K at time $t_0$ by obtaining $H_{forw}(t_0)$ and $H_{rev}(t_0)$ using this method and evaluating $K=H_{forw}(t_0)/H_{rev}(t_0)$. The calibration constants for the master and slave transmitters should be computed as if all channels were measured at the same $t_0$.

To be precise, it is only necessary that all forward channels are measured as if they were computed at the same time, and all reverse channels need to be measured as if they were computed at the same time and all transmitters shared a common oscillator. The time at which the forward channels are measured can be different from the time at which the reverse channels are measured. However, for ease of exposition, we will describe the system here as if all channels are measured at the same time $t_0$.

To achieve this effect, a slave transmitter can use a combination of the techniques described above to correct both forward and reverse channels for any phase rotations between $t_0$ and the time at which the forward and reverse channels for the slave transmitter are measured.

In some cases, the transmitters might desire the exact phase of the forward channel and not simply a rotated version. In such a case, the receiver can simply include the phase of the forward channel from the master transmitter to the receiver (or equivalent information such as the computed frequency offset, from which the phase can be computed by multiplying by elapsed time and adding to the previous estimate) in its acknowledgment. The receiver can optionally encode this phase compactly using a differential scheme. Specifically, the receiver can communicate a phase θ to a transmitter by transmitting the symbol $x_1=x$ and $x_2=xe^{j\theta}$ in different slots (for instance, different in time, frequency or space). The transmitter can then simply recover the value θ by computing arg $(x_1^*x_2)$, and can perform this same operation for all relevant subcarriers. As described above, once the master and slave transmitters emulate a traditional MIMO system in the computation of their forward channels, the difference between the phase of the actual forward channel and the phase of the forward channel computed by multiplying the reverse channel with the calibration factor is precisely the rotation factor, $2\Delta\omega\Delta t$. The master transmitter can therefore recover the rotation factor by subtracting the received value of θ, the actual forward phase, from its computed forward phase. It can communicate the rotation factor to all the slaves using its wired backhaul or other connectivity. The slaves can then apply this adjustment to their own forward channel estimate.

In some examples, the transmitters can exchange their updated channel information with each other across the wired backhaul or other connectivity, and use this updated channel information for one or more future packets. The frequency of update can be determined based on the required tolerance and responsiveness to mobility or other environmental changes.

Note that although described in the context of access points that are linked by wired or wireless channels used to distribute the data that is sent to the clients, the approaches may be used in other situations as well. For example, in a data forwarding situation, a data packet may be forwarded from one set of wireless nodes to a subsequent set of wireless nodes using a coherent transmission approach described above. This process can be repeated to reach the destination for the data packet.

Implementations of the approaches may be in software, for example, stored on tangible machine readable media, for controlling processors in the access points and/or clients. Some implementations may use special-purpose hardware (e.g., application specific integrated circuits) in addition or instead of software.

Other features and advantages of the invention are apparent from the following description, and from the claims.

What is claimed is:

1. A method for operating a slave transmitter to provide coherent transmission with a master transmitter, the method comprising:
    forming a first signal for a data frame for modulation and coherent transmission from the slave transmitter with a transmission of a corresponding signal from the master transmitter;
    maintaining an estimate of a time-varying phase offset determined from a frequency reference at the slave transmitter and a transmission received at the slave transmitter from the master transmitter;
    modifying the first signal for the data frame prior to modulation according to a time variation of phase within the data frame determined from the estimate of the time-varying phase offset; and
    modulating the modified first signal according to the frequency reference at the slave transmitter.

2. The method of claim 1 wherein the frequency reference at the slave transmitter comprises at least one of a modulation frequency and a sampling clock reference and the frequency reference is independent between the master transmitter and the slave transmitter.

3. The method of claim 1 further comprising:
    concurrently transmitting the corresponding signal modulated at the master transmitter from the master transmitter and the modulated modified first signal from the slave transmitter.

4. The method of claim 3 further comprising forming the first signal and the corresponding signal according to a Multiple-Input Multiple-Output (MIMO) approach for concurrent data communication to a plurality of receivers.

5. The method of claim 4 wherein modulating the modified first signal comprises and Orthogonal Frequency Division Multiplexing (OFDM) approach.

6. The method of claim 1 wherein maintaining the estimate of a time-varying phase offset comprises demodulating the transmission from the master transmitter, and comparing the demodulated transmission to expected demodulated values.

7. The method of claim 6 wherein the transmission from the master transmitter comprises a preamble of a transmission of the corresponding signal from the master transmitter.

8. The method of claim 6 wherein the transmission from the master transmitter comprises a frequency multiplexed transmission, and comparing the demodulated transmission to expected demodulated values includes performing said comparison at multiple of the multiplexed frequencies and combining results of the comparisons.

9. The method of claim 1 wherein the first signal comprises a frequency multiplexed signal, and modifying the first signal prior to modulation comprises modifying each of multiple multiplexed components of the first signal according to the estimate of the time varying phase.

10. The method of claim 1 wherein forming the first signal for transmission includes receiving data representing the first signal over a communication link separate from the transmission system used to transmit the modified first signal from the slave transmitter.

11. The method of claim 1 wherein a transmission of the modulated modified first signal has a substantially constant phase relationship with the transmission of the corresponding signal from the master transmitter for a duration of the transmission of the modulated modified first signal.

12. A method for estimating a forward channel from a slave data transmitter to a data receiver while emulating coherent operation with a master transmitter with an independent frequency and clock reference, the method comprising:
  utilizing transmissions from the receiver to the transmitters to determine a complex multiplicative factor between the forward channel and a reverse channel;
  maintaining an estimate of a time-varying phase offset between modulation of a transmission from the master and a frequency reference at the slave access point based on transmissions received at the slave transmitter from the master transmitter;
  modifying the received signal from the data receiver prior to decoding according to the estimate of the time-varying phase offset;
  decoding the received signal according to the frequency reference at the slave data transmitter and computing the reverse channel from the data receiver to the slave data transmitter; and
  computing an estimate of the forward channel by multiplying the estimate of the reverse channel by the computed calibration factor.

13. The method of claim 12 where the estimated forward channels are used by one or more slave transmitters to provide distributed coherent transmission from multiple wireless transmitters to one or more receivers.

14. Software embodied on a non-transitory tangible computer-readable medium comprising instructions for causing a processor associated with a slave transmitter to provide coherent transmission with a master transmitter by:
  forming a first signal for a data frame for modulation and coherent transmission from the slave transmitter with a transmission of a corresponding signal from the master transmitter;
  maintaining an estimate of a time-varying phase offset determined from a frequency reference at the slave transmitter and a transmission received at the slave transmitter from the master transmitter;
  modifying the first signal for the data frame prior to modulation according to a time variation of phase within the data frame determined from the estimate of the time-varying phase offset; and
  modulating the modified first signal according to the frequency reference at the slave transmitter.

15. The software embodied on a non-transitory tangible computer-readable medium of claim 14 wherein a transmission of the modulated modified first signal has a substantially constant phase relationship with the transmission of the corresponding signal from the master transmitter for a duration of the transmission of the modulated modified first signal.

16. A slave transmitter configured to provide coherent transmission with a master transmitter, said slave transmitter being configured to:
  form a first signal for a data frame for modulation and coherent transmission from the slave transmitter with a transmission of a corresponding signal from the master transmitter;
  maintain an estimate of a time-varying phase offset determined from a frequency reference at the slave transmitter and a transmission received at the slave transmitter from the master transmitter;
  modify the first signal for the data frame prior to modulation according to a time variation of phase within the data frame determined from the estimate of the time-varying phase offset; and
  modulate the modified first signal according to the frequency reference at the slave transmitter.

17. The slave transmitter of claim 16 wherein a transmission of the modulated modified first signal has a substantially constant phase relationship with the transmission of the corresponding signal from the master transmitter for a duration of the transmission of the modulated modified first signal.

18. An apparatus comprising:
  a master transmitter including
    a first oscillator for operating at a first oscillator frequency, and
    a first transmitter module for transmitting one or more data frames each including one or more symbols, the first transmitter module being coupled to the first oscillator for operating at the first oscillator frequency; and
  one or more slave transmitters, each slave transmitter of the one or more slave transmitters including
    a second oscillator which operates at a second oscillator frequency,
    a receiver module for receiving transmissions, including a first transmission of one or more data frames, from the master transmitter, the receiver module operating at the second oscillator frequency and including a frequency offset tracking module for determining a frequency offset between the first oscillator frequency and the second oscillator frequency based on the first transmission received from the master transmitter, and
    a second transmitter module for transmitting one or more data frames each including one or more symbols, the second transmitter module operating at the second oscillator frequency and including a frequency offset compensation module for compensating for a time variation of the frequency offset of the symbols within each of the one or more data frames before transmitting the one or more data frames;
  wherein each of the one or more slave transmitters provides coherent transmission with the master transmitter.

19. The apparatus of claim 18 wherein a transmission of the one or more data frames by the second transmitter module has a substantially constant phase relationship with a transmission of the one or more data frames by the second transmitter module for a duration of the transmission of the one or more data frames by the second transmitter module.

20. A method for operating one or more slave transmitters to provide coordinated transmission with a master access point to a plurality of receivers, the method comprising:

loading a plurality of symbols destined for a subset of the plurality of receivers into a master symbol storage element coupled to the master transmitter;

loading the plurality of symbols destined for the subset of the plurality of receivers into each of a plurality of slave symbol storage elements coupled to each of the slave transmitters;

maintaining an estimate of a time-varying phase offset between a transmission from the master and a frequency reference at each of the slave transmitters based on transmissions received at the slave transmitters from the master transmitter;

forming a signal for concurrent transmission from the one or more slave transmitters with a transmission from the master transmitter, forming the signal including combining a plurality of sub-signals representing the plurality of symbols such that upon transmission of the signal, each sub-signal of the plurality of sub-signals is present at an antenna of one or more receivers of the subset of the plurality of receivers and is cancelled at an antenna of one or more clients of the subset of the plurality of receivers;

modifying the signal prior to modulation according to the estimate of the time-varying phase offset; and modulating the modified signal according to the frequency reference at each of the slave transmitters.

21. The method of claim 20 wherein:

the plurality of symbols includes different symbols destined for each receiver, and all of the plurality of symbols intended for the receivers are loaded into the master and slave storage elements;

the signals are formed at each of the transmitters to allow each receiver to simultaneously receive and decode the symbols destined to it;

each receiver then decodes the symbols using the combined transmission, such that for each receiver, the combined transmission simultaneously achieves a rate substantially equal to the rate that receiver would obtain from a single transmission from the transmitter with the strongest signal to it.

22. The method of claim 20 wherein:

the same symbols are loaded into the master storage element and the slave storage elements, the symbols being destined for a single receiver; and the signals are formed at each of the transmitters to combine with some predictable relative phase at the intended receiver.

* * * * *